United States Patent
Patin

[11] Patent Number: 5,769,381
[45] Date of Patent: Jun. 23, 1998

[54] PROCESS FOR PREVENTING VIBRATIONS OF CYLINDERS IN A CYLINDER CONVEYOR

[76] Inventor: Pierre Patin, 15, rue Buffon, 75005 Paris, France

[21] Appl. No.: 510,644

[22] Filed: Aug. 3, 1995

[30] Foreign Application Priority Data

Aug. 3, 1994 [FR] France ................................. 94 09647

[51] Int. Cl.⁶ .................................................... F16C 3/20
[52] U.S. Cl. ............................ 248/618; 29/446; 248/638; 464/180
[58] Field of Search ................................. 248/638, 618; 464/179, 180; 29/446, 452

[56] References Cited

U.S. PATENT DOCUMENTS

| | | | |
|---|---|---|---|
| 3,037,573 | 6/1962 | Larsen | 464/180 X |
| 3,155,187 | 11/1964 | DeLorean | 464/180 X |
| 3,292,389 | 12/1966 | Adloff et al. | 464/180 X |
| 3,811,295 | 5/1974 | Stamenkovic | 464/180 |

FOREIGN PATENT DOCUMENTS

| | | |
|---|---|---|
| 2 359 327 | 2/1978 | France . |
| 712189 | 10/1941 | Germany ................................. 464/180 |
| 870781 | 6/1961 | United Kingdom . |
| 1093432 | 12/1967 | United Kingdom ................... 464/180 |
| 1 547 721 | 6/1979 | United Kingdom . |

OTHER PUBLICATIONS

Search Report FR 94 09647.

*Primary Examiner*—Derek J. Berger
*Attorney, Agent, or Firm*—Pollock, Vande Sande & Priddy

[57] ABSTRACT

A process for preventing vibrations of a shaft (1) driven into rotation around its axis and having a length greater than its diameter. The shaft is maintained at both ends by fixed centering devices (2a, 2b) and at its center by at least one intermediate support (12). The support is located on one side of the shaft, and its position with respect to the end centering devices (2a, 2b) is adjusted so that, in its central part, the center (0) of the shaft is away from the line running through the centers of the end centering devices (2a, 2b) on the side opposite the intermediate support (12). The shaft is thus subjected to permanent deformation and maintained applied onto rolling bearing devices (7a, 7b) by an elastic recall force.

6 Claims, 3 Drawing Sheets

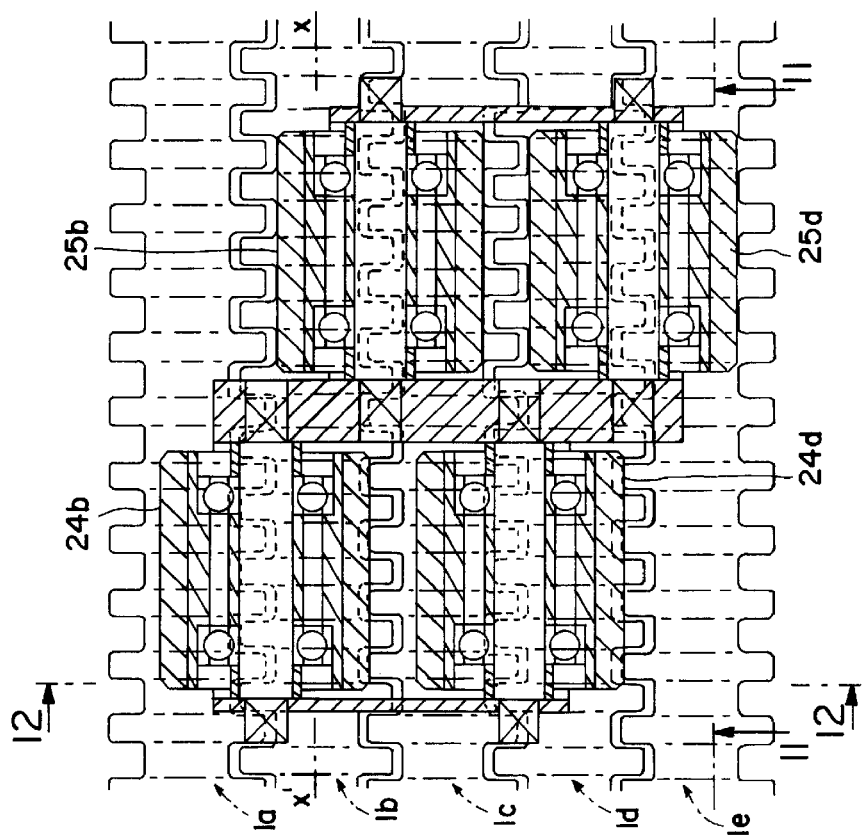
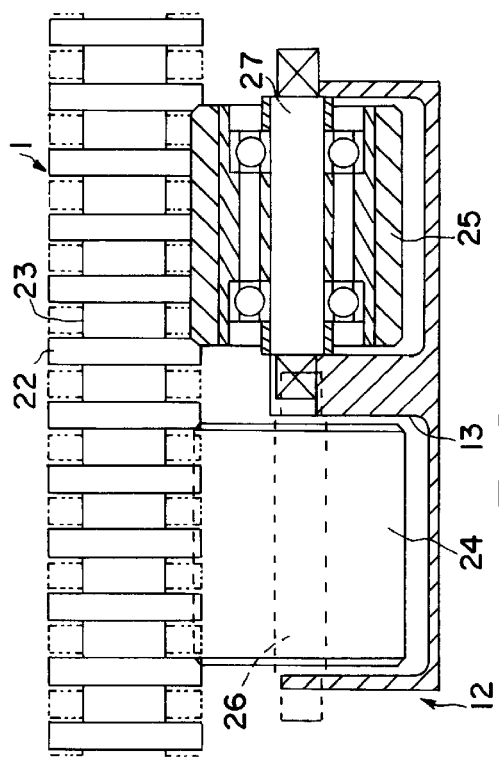
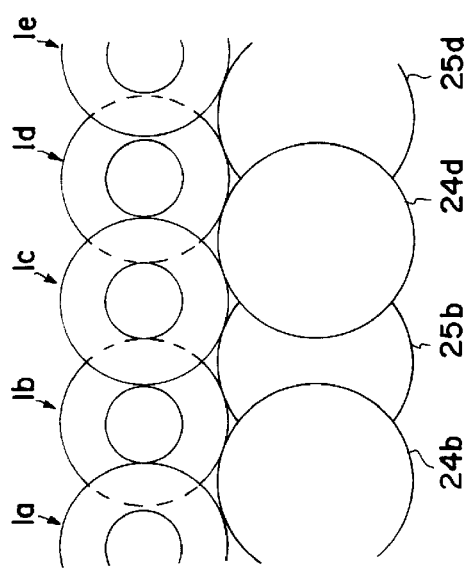

PROCESS FOR PREVENTING VIBRATIONS OF CYLINDERS IN A CYLINDER CONVEYOR

FIELD OF THE INVENTION

The invention relates to a process and a device for preventing vibrations of a shaft whose length is greater than its diameter and which is driven into rotation, at high speed, around its axis.

It is applicable especially to cases when a shaft must be entirely free from all bearing contact on a sector of its periphery, such as, for instance, in the case of a conveyor belt moving on a series of parallel cylinders.

BACKGROUND OF THE INVENTION

Generally, a rotary shaft is maintained at both its ends by two centering devices such as roller bearings, bushes or other types of centering bearings, which determine a straight theoretical axis extending between the centers of both bearings.

In practice, it is very difficult to achieve accurate and permanent coincidence of the center of gravity of a shaft with a point of its geometrical axis. Consequently, when the shaft is driven into high speed rotation, it is subjected to a centrifugal force whose direction revolves round the axis at the rotation speed, and which generates vibrations. This effect is particularly significant for long shafts, i.e., in practice, for parts or elements of cylindrical parts whose length between the bearing points equals twenty times their diameter.

This is true, especially, of conveyor belts used for the transport of people or of goods and supported by cylinders whose diameter, for various reasons, must be quite small and which, therefore, turn at high speed.

In order to avoid the effects of such vibrations, it is commnon usage, for instance, for the machining of a long shaft on a lathe, to place at one or several points of the span between spikes, a device called a telescope, whose purpose it is to maintain the geometrical axis of the part between spikes on a straight line and which is made of rollers which exert onto the rotating part reactions concurring on its axis whose resulting force is normally equal and opposite the weight of the shaft, and which keep this shaft along a straight direction, flush with the rotary parts of the lathe. Generally, the telescope comprises three rollers arranged at 120°, one of the three being placed above the part and vertically with respect to its axis.

Another solution consists in placing, at one or more points on the shaft, shock-absorbing devices surrounding the shaft which can be connected, by springs or by hydraulic or pneumatic jacks, to a floating mass or to a fixed bearing mass.

However, as mentioned previously, such solutions are not applicable to all cases.

Especially for cylinder conveyors, it is possible to arrange transport rollers or bushes at the lower part of the cylinders, but not above these cylinders, whose upper part must remain totally free on a sector in order to sustain a conveyor belt or, directly, the people or the goods thus transported.

Generally, in such cases, cylinders whose diameter is quite significant relative to their length, are used. They are therefore applied by their own weight onto the bearing rollers. Consequently, these cylinders must be relatively remote from one another.

Still, in the case of people movers, for instance, the cylinders should not be located too far from one another and, unless the width of the belt is to be reduced excessively, cylinders of relatively small diameter relative to their length should be used.

It can then be observed that the shaft may be subjected, starting from a critical rotation speed, to a vibration which is obviously undesirable, since it generates noises and resonance phenomena whose amplitude may be quite significant to reach the breaking point.

SUMMARY OF THE INVENTION

It is an object of the invention to remedy these shortcomings thanks to a process and a device for preventing to vibrations of a long shaft, even at very high rotation speeds.

The invention applies to any device comprising a rotary shaft whose length in great relative to its diameter, and which is maintained for possible a rotation at both its ends by fixed centering bodies and, at its center, by one or several intermediate supporting means.

According to the invention, the intermediate supporting means is located on one side of the shaft, and its position with respect to the end centring bodies is adjusted so that, in its centering part, the center of the shaft is away from the line running through the centers of the end centering devices, on the side opposite the intermediate support. The shaft is thus subjected to permanent deformation and maintained applied onto the intermediate support by an elastic recall force.

Particularly advantageously, the position of the bearing devices of the intermediate support is adjusted so that the deformation of the shaft determines an elastic recall towards the bearing devices, which exceeds the offset stresses to the outside, resulting from centrifugal force.

Advantageously, two intermediate supporting means can be used, spaced from one another and arranged respectively at equal from both centering devices at the ends of the shaft.

Such an arrangement make it possible to increase the critical speed considerably.

BRIEF DESCRIPTION OF THE DRAWINGS

FIG. 10 is a schematic bottom plan view, partly in section of the application of the invention to a roller conveyor.

FIG. 11 is an axial cross-section along the A—A of FIG. 10.

FIG. 12 is a transverse cross-section along B—B of FIG. 10.

DESCRIPTION OF PREFERRED EMBODIMENT

Figure 1:
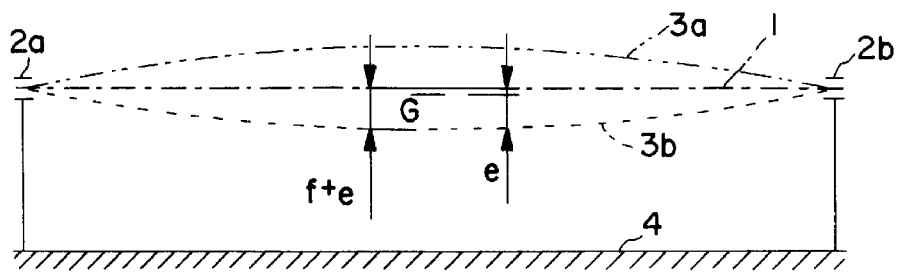
FIG. 1 represents the deformation of a long shaft in rotation between two bushes or bearing rollers.

FIG. 1 shows a shaft, represented by its theoretical axis 1, which rotates on two rollers or bushes 2a and 2b supported by a rigid structure 4. The center of gravity G is, when not working and without taking the weight into account, located at a distance e from the theoretical axis. During rotation of the shaft, the centrifugal force causes the deformation of the axis which exhibits a deflexion f, and the deformed line is comprised within a spindle-shaped volume whose marks on the vertical plane are two curves 3a and 3b.

The operation of the weight moves the whole set of these deformed lines downwards.

However, a resonance phenomenon can take place when the centrifugal force becomes greater than the elastic recall force due to the deformation of the average fiber, the weight of the shaft which acts alternately in the same direction as the centrifugal force and in the opposite direction (for vertical movements), not affecting the amplitude of the vibration.

For a free length shaft 1 with mass m=P/g, the centrifugal force Fc is associated with the angular speeds ω (in radians/second), of the offset of the center of gravity equals e:

$$Fc = m\omega^2\, e$$

This force tends to impart to the shaft a deflexion f which is added to e, and the centrifugal force becomes:

$$Fc = P\omega^2 (f+e)/g$$

The elastic deformation of the shaft between simple bearing points under a stress F is a deflexion f' given by the formula:

$$f' = Fl^3/48\, EI$$

and conversely, the elastic recall force caused by a deflexion f' equals:

$$48EI\, f'/l^3$$

If the centrifugal force, at a given speed, exceeds the elastic recall force, i.e. if:

$$P/g\omega^2 (e+f) > (48EI/l^3) f'$$

the value of (e+f) will be greater than f' and the phenomenon will increase, inducing wide amplitude vibrations which may even reach a breaking point. The critical speed corresponds to f'f+e, whereas:

$$\omega^2 = (48EI/Pl^3)g \quad \omega = 6.93\sqrt{(EI/Pl^3)g}$$

Moreover, this critical speed corresponds to the first frequency mode of vibration critical to the shaft.

Figure 2:
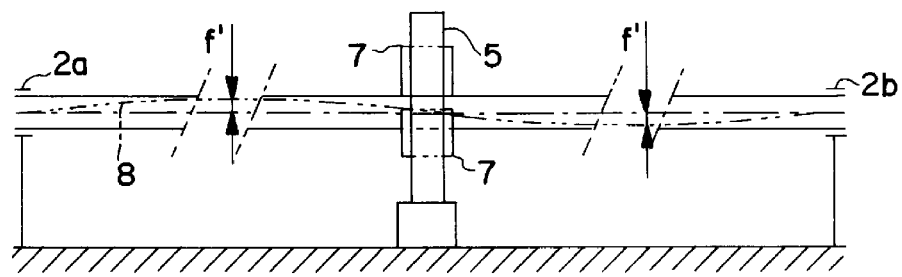
FIG. 2 shows the results obtained using a prior art centering device.
Figure 3:
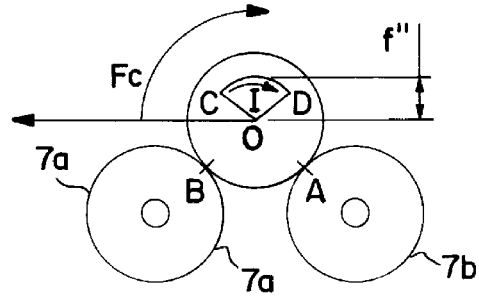
FIG. 3 shows schematically the travel of one point of the axis of shaft subjected to vibrations.

If a centering telescope 5 is used, as shown in FIG. 2, the deflexion f' exhibited by the deformed line 8 on each free shaft section, between the centering bearing 2a, 2b and the intermediate telescope 5, is extremely small.

Figure 4:
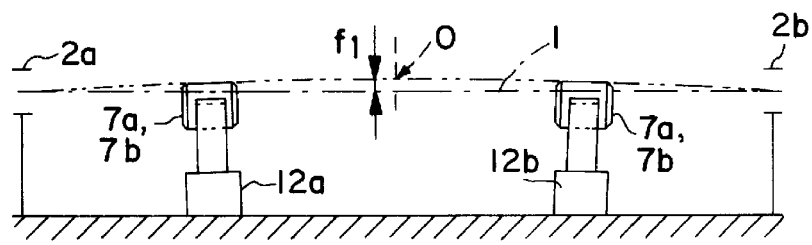
FIG. 4 is a schematic longitudinal view of a shaft fitted with the device according to the invention.

However, when the shaft can only be supported from underneath, by seeking solely to maintain it on a straight line, analysis of the deformations of the shaft shows that the centre part of the former tends to vibrate, at high speed, in the way shown diagrammatically on FIG. 4 which represents the travel of a point I of the axis subjected to a centrifugal force Fc revolving at the rotation speed of the shaft and bearing, in its centre part, on two spaced rollers 7a, 7b.

This travel can be broken down as follows

1) As long as the centrifugal force Fc is directed downwards and comprised between the radii OA and OB, the point I remains immovable.

2) Fc being comprised between OB and OC, the axis BC contingent upon Fc, the rotation speed, I describes an arc of a circle OC while bearing on the roller 7a.

3) When the value of Fc and the elastic reaction of deformation of the shaft are equal and opposite, I describes an arc of a circle CD centered on 0 and with radius f".

4) When I arrives at D symmetrically to C with respect to the vertical plane running through 0, the shaft touches the roller 7b, then describes an arc of a circle DO symmetrically to OC.

At some points O, C, D, of the travel, the value and the directions of the speeds vary suddenly and the actual travel may be slightly different.

Moreover, the shock generated when I passes through the point D may generate side phenomena.

It is however possible to analyze the movement of the axis and, for instance, to break down the displacement of the point I into a Fourier series comprising a basic frequency corresponding to the rotation speed and a certain number of harmonics.

The idea of the invention is to suppress the vibrations and all the spurious movements by exerting a prestress from bottom to top onto the shaft in rotation in order to impart a permanent, upwardly convex deformed line, so that this prestress applies the shaft permanently onto a hub of the intermediate support 12 fitted with rollers 7.

The deformed line thus imparted to the shaft has been selected so that, whatever the rotation speed N=60/32 (RPM) of the shaft and the offset e of the center of gravity, the elastic maintaining force caused by the deformation always remains much greater than the centrifugal force, without causing in the shaft alternate stresses greater than those defined by the laws of Wöhler.

In other words, instead of seeking, as in prior art installations, to maintain the rotating shaft along a straight line, it is deformed so that its elastic deformation keeps it in permanent contact with the bearing rollers 7, thereby suppressing vibrations.

Figure 5:
FIG. 5 shows cross-sections of FIG. 4 at a right angle with respect to the various bearing points.

FIGS. 4 and 5 show schematically a device for the implementation of the process according to the invention.

FIG. 4 shows the deformed line of the axis of the shaft 1 by the use of two bearing assemblies 12a, 12b, each comprising two rollers and supporting the shaft 1 while applying forces such that when not working, the shaft exhibits a deflexion f1. FIG. 5 shows the cross-sections of FIG. 4 at a square angle with respect to the corresponding bearing points.

Figure 6:
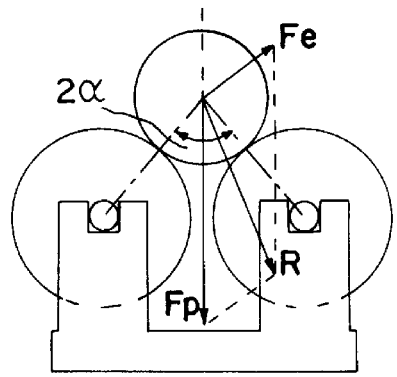
FIG. 6 shows the operation of the prevailing forces.

FIG. 6 shows how the prestress force Fp should be calculated so that the supported shaft does come away from the rollers: the resultant R from the forces Fc and Fp must remain within the angle 2 α determined by the three axes of the shaft and of the rollers. It appears that the prestress forces must be the greater with respect to Fc the closer the axes of the rollers.

Naturally, the forces causing the vibrations are not negated, but brought back to a constant value associated with the sole offset of the center of gravity and, instead of being solely applied to the shaft, which is relatively lightweight, they are transmitted by the rollers and the bearings or bushes to the whole supporting structure with the possibility of interposing shock-absorbing elements at several points.

The prestress forces are applied by a set of springs in conjunction with a backlash elimination device to prevent any spurious movement.

Figure 7:
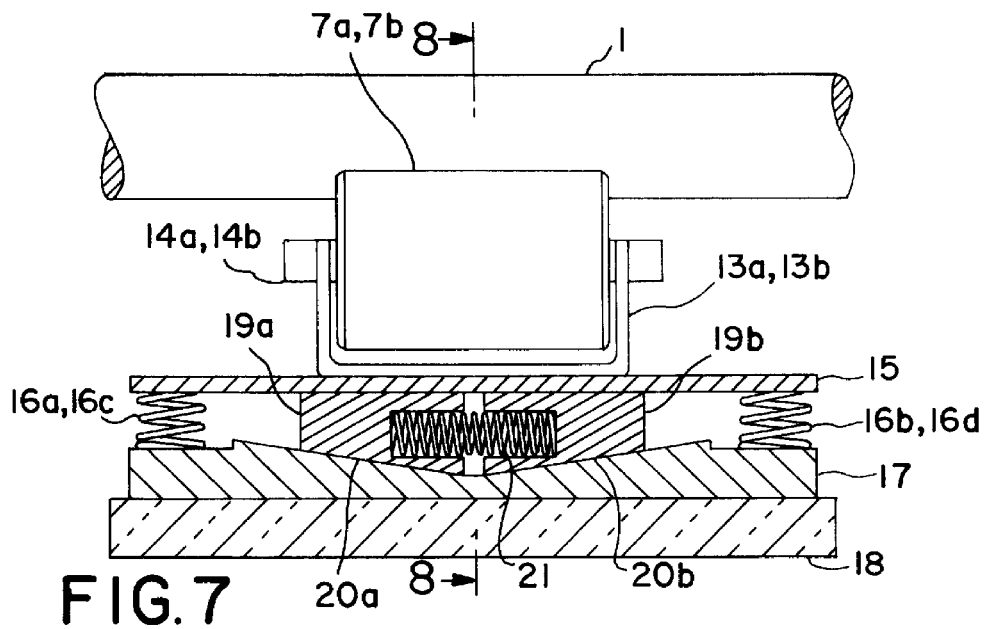
FIG. 7 is a longitudinal of another embodiment of the prestress device according to the invention.
Figure 8:
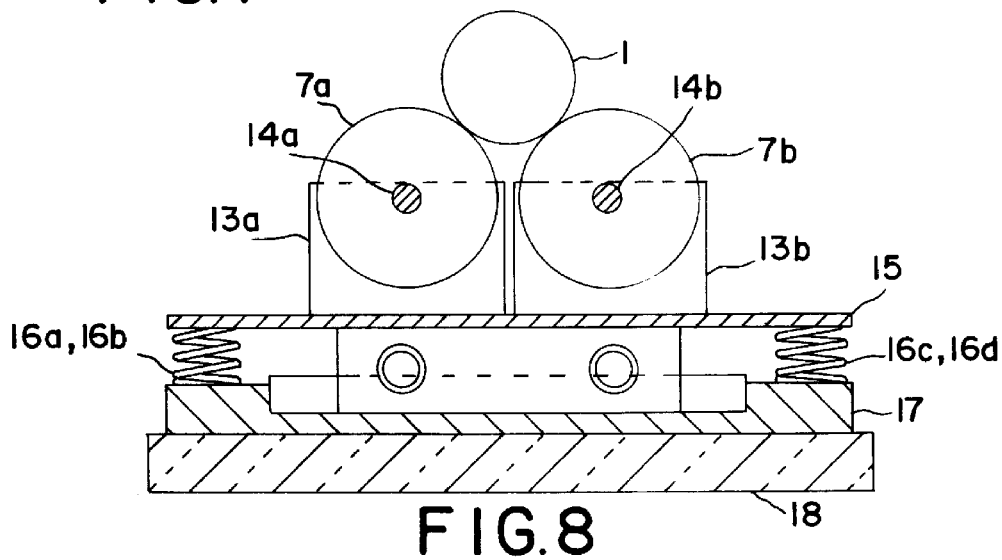
FIG. 8 is a transverse cross-section of the device of FIG. 7.

FIGS. 7 and 8 show a practical embodiment of the bearing device to prestress the shaft. FIG. 7 is a view from above and FIG. 8 a cross-section through the plane A—A of FIG. 7.

The shaft 1 stays on the bearing assembly 12 thanks to two rollers 7a, 7b, whose axes 14a, 14b, are supported by a plate 15 which is pushed upward by four springs 16a, 16b, 16c, 16d, arranged at the four angles, themselves bearing on a plate 17 which rests on a structure (not shown), thanks to a shock-absorbing element 18.

The springs 16a, 16b, 16c, 16d, exert an upward force which is stabilised by a backlash elimination device made of two wedges 19a, 19b, bearing on two tilted planes 20a, 20b of the plate 17 and spaced by springs 21. The purpose of this backlash elimination device is to maintain the force applied by the springs constant : any separation of the shaft from its bearing rollers raises the plate 15, a raising motion which is immediately compensated for by the set of wedges and avoids any vibrations of the springs.

Figure 9:
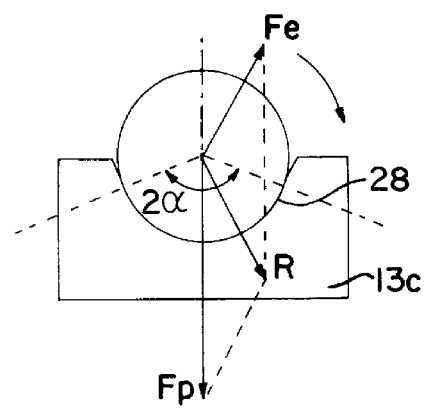
FIG. 9 shows another embodiment of an intermediate support.

The bearing rollers constituting the intermediate supports could be replaced by other rotating bearing means, such as smooth bearings. FIG. 9 thus shows a support 13c on which a concave bearing surface has been arranged, fitted with a semi-bush 28 surrounding the lower section of the shaft 1 on an angular sector in the order of 120° or less.

On the other hand, if the invention is applied especially to the manufacture of conveyor belts bearing on parallel cylinders, it is particularly advantageous in cases when the belt must be omitted, with the people or goods transported bearing directly upon the cylinders.

This is the case especially with variable speed conveyors. The cylinders must then be brought much closer to one another in order to determine a more or less continuous bearing surface for the feet of the people transported and it is advantageous to use imbricated grooved cylinders, as shown schematically in FIG. 10 which is a view from underneath with partly cross-sectioned, whereas FIG. 11 is an axial cross-section.

Each cylinder is grooved in order to accommodate spaced disks 22 mounted on a center shaft 23 of small diameter, and two successive cylinders 1a, 1b are staggered axially so that the disks of a cylinder engage the grooves of the adjacent cylinders, which enables a good support for the passengers' feet. Since the cylinder axes are thus quite close to one another, the bearing rollers of the intermediate supporting means must also be staggered, as shown in FIGS. 10 and 11.

According to the invention, each cylinder stays with its center part on one or several intermediate supporting means 13 each comprising a pair of rollers 24, 25 on which run the disks 22 of the cylinder 1.

However, both rollers 24, 25 of each pair are staggered longitudinally and transversally, as shown in FIGS. 10 and 11.

Moreover, the axes 26, 27 of the rollers 24, 25 are located in the middle plane between the cylinders 1, and their diameters are determined so that each roller is in contact with two adjacent cylinders.

It can thus be seen in FIGS. 10 and 12 that the cylinder 1b stays on the rollers 24b, 25b, which, on the other hand, are in contact, respectively, with the two adjacent cylinders 1a and 1c.

Besides, the cylinder 1d stays on a pair of rollers 24d, 25d which are arranged in the same way as the rollers 24b, 25b and can thus be imbricated with the former, as specified in FIG. 10 and which, moreover, are in contact, respectively, with the cylinders 1c and 1e located respectively on either side of the roller 1d.

The cylinder 1c thus stays on the rollers 25b and 24d of two different pairs associated respectively with the adjacent cylinders 1b and 1d and the same goes for the cylinder 1e.

Obviously, each intermediate support 13 of a pair of rollers 24, 25 is associated, according to the invention, to a height adjustment means of the rollers, which can be of the type represented on FIG. 7 and has not been represented on FIG. 11.

Due to this peculiar arrangement, it is possible to locate the parallel cylinders close enough to determine a more or less continuous bearing surface, while connecting each cylinder to an intermediate support, adjustable in height, in order to avoid vibrations, in spite of the small diameter of the center shaft 23 of each cylinder.

I claim:

1. A process for preventing vibrations of cylinders in a cylinder conveyor comprising a plurality of parallel cylinders each having an upper sector for supporting persons or goods, each of said cylinders having a central part supported from below by means of at least one revolving intermediate bearing device extending on a lower sector of said cylinder and leaving free said upper sector of said cylinder opposite said intermediate bearing device in order to support persons or goods, each cylinder having a longitudinal axis and two ends maintained by fixed end centering devices aligned on a line, said cylinders being driven for rotation about their longitudinal axes, said process comprising the step of
   (a) adjusting a position of said at least one intermediate bearing device for decentering a center of said central part of each cylinder away from the line extending through the center of both end centering devices, on a side opposite said intermediate bearing device, and thereby subjecting each cylinder to upwardly convex deformation providing an elastic recall force which maintains said central part of each cylinder in permanent contact with said at least one intermediate bearing device, thereby preventing vibrations.

2. A process according to claim 1, comprising the step of maintaining said central part of said shaft by two said intermediate supporting means, spaced from one another and respectively located equidistantly from each of said centering devices of the ends of said shaft.

3. A process according to claim 1, wherein said shaft is driven in rotation at a speed adapted to cause deformation of each cylinder by centrifugal force, said process comprising the step of adjusting the position of said at least one intermediate supporting means to subject each cylinder to a deformation determining an elastic recall force towards the intermediate supporting means, greater than outward offset forces resulting from said centrifugal force.

4. A process according to claim 3, wherein said shaft is substantially horizontal and said at least one intermediate supporting means comprises at least two revolving bearing devices arranged symmetrically with respect to a vertical plane passing through said longitudinal axis of said shaft, said process comprising the step of adjusting the position of said bearing devices taking into account a weight of said shaft, so that application pressure onto said bearing devices, resulting from warp given to the axis of said shaft in an opposite direction, is greater than the effects of said centrifugal force.

5. The process according to claim 1, wherein said parallel cylinders are sufficiently close to one another to constitute a substantially continuous bearing surface, each cylinder having a central part supported by at least one intermediate bearing device comprising a supporting part of adjustable height carrying two bearing rollers mounted for rotation about axes parallel to the axis of a corresponding cylinder, said process comprising the step of longitudinally and transversely staggering the intermediate bearing devices corresponding to adjacent cylinders such that the rollers of two adjacent supports are imbricated into one another.

6. The process according to claim 5, wherein only a first cylinder out of two cylinders is associated with at least one intermediate bearing device carrying first and second bearing rollers staggered symmetrically on either side of the axis of said first cylinder, said process comprising the step of placing the axes of said first and second rollers in vertical mid-planes between said first cylinder and adjacent second and third cylinders, so that each first roller of said intermediate support bears simultaneously on said first cylinder and on an adjacent second cylinder located on a same side as said first roller, and said second roller of said intermediate support bears simultaneously on said first cylinder and on an adjacent third cylinder located on a same side as said second roller.

* * * * *